Figure 1:
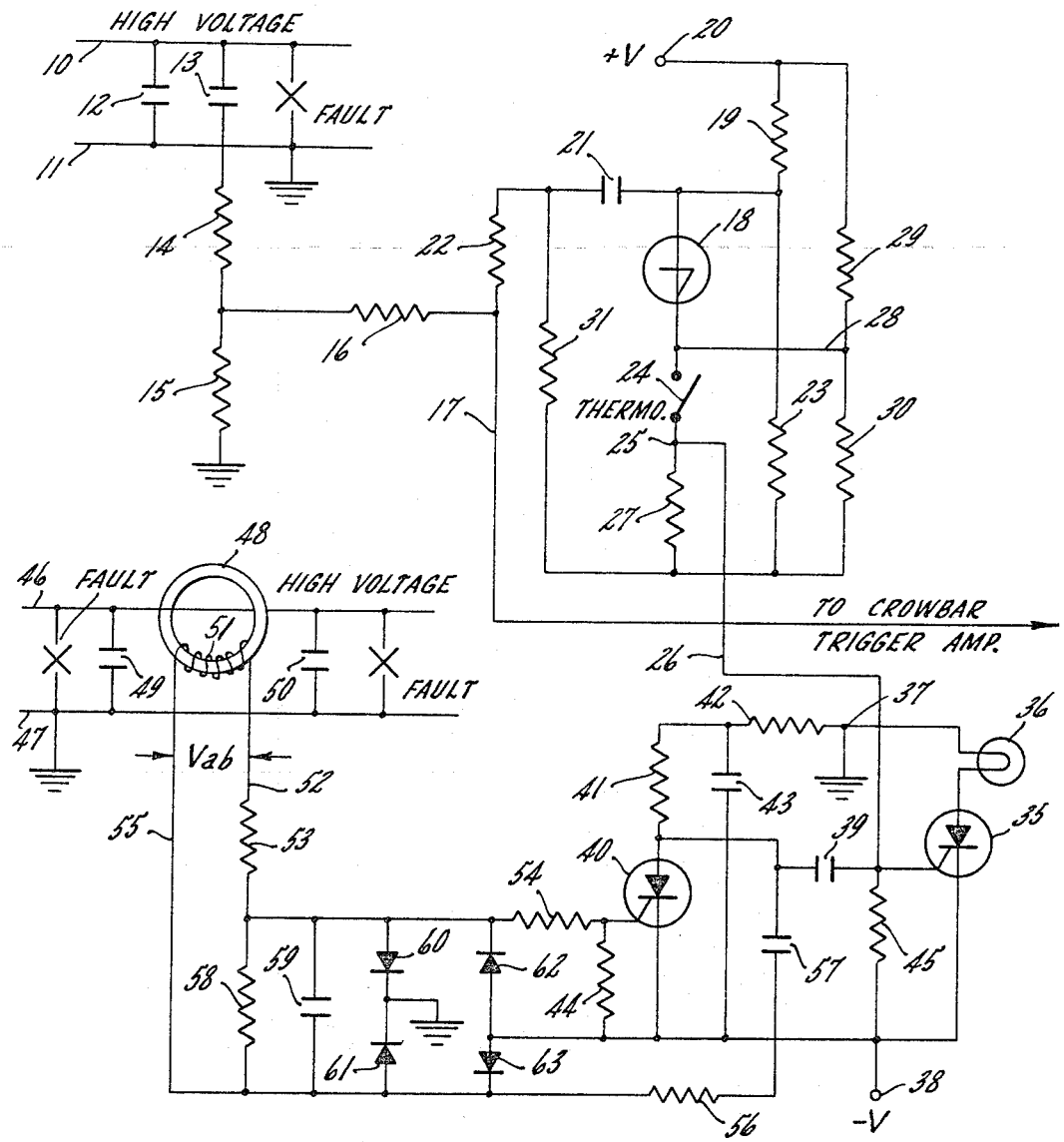

Oct. 4, 1966

E. H. HECKMAN 3,277,460

CROWBAR TRIP AND TRIP INDICATOR CIRCUIT

Filed July 11, 1963

INVENTOR.
Earl Herbert Heckman,
BY
H. H. Losche
Att'ys.

United States Patent Office 3,277,460
Patented Oct. 4, 1966

3,277,460
CROWBAR TRIP AND TRIP INDICATOR CIRCUIT
Earl H. Heckman, Severna Park, Md., assignor, by mesne assignments, to the United States of America as represented by the Secretary of the Navy
Filed July 11, 1963, Ser. No. 294,460
9 Claims. (Cl. 340—253)

This invention relates to indicator circuits for indicating faults of electronic circuits and more particularly to crowbar trip and indicator circuits for detecting and short circuiting or switching off voltage supply circuits to the electronic circuits in which a fault exists and for indicating these faults.

In the known fault indicator and trip circuits it has been a usual practice to utilize a fault indicator circuit with an output capable of tripping relays or circuit breakers to disconnect the power supply to circuits where faults exist. An even more common practice is to fuse the voltage supply lines to the circuit so that high currents produced by a fault will blow the fuse. All of these fault and trip indicator circuits have the disadvantage of being too slow in switching off the power supply in time to avoid damage to the electronic circuit components or elements which it supplies. Electronic tripping circuits greatly reduce the time interval from the initial existence of the fault in switching off or short circuiting of the voltage supply after a few cycles of the supply voltage, but here again the safety circuitry is not fast enough to protect semiconductor type of electronic components. Protective circuitry is needed which is rapid enough after detection of a fault to cut off the power supply within one-half cycle or cycle of the voltage supplied.

In the present invention it is recognized that radar application requires a voltage supply circuit to be disconnected or short circuited in a very short interval of time after fault occurs to protect the radar circuitry, particularly in times of combat, so that none of the electronic components are destroyed and so that the faulty circuit may be readily reconditioned for use. In this invention the crowbar trip circuit is operative to function within a few microseconds whenever a fault occurs in the associated radar circuitry. This invention contemplates the operation of a crowbar trip circuit when either a short circuit occurs in tthe high voltage circuits supplied to the radar or whenever any of the elements or components of the radar exceed a predetermined operating temperature. In order to trip the crowbar, a positive or negative signal of about 200 volts is applied to the amplifier which fires a trigger gap or a spark gap utilized to short out or disconnect the power supply. Four-layer semiconductors are utilized in the fault detector circuit for the reason that they readily avalanche to produce the fault signals necessary to remove a high voltage supply. In one indicator circuit a four-layer diode is utilized in series with a thermostat to avalanche whenever the thermostat is closed by excessive heat from electronic elements in environments in which the thermostat is placed. Silicon diode rectifiers (SCR) are likewise used in the detector circuit to avalanche under other conditions of fault in the high voltage supply, one SCR which is in circuit with an indicator light or the like to indicate when any particular fault occurs. It is therefore a general object of this invention to provide a fault detector utilizing four-layer semiconductors that are responsive to the current flow in the high voltage supply circuit through inductive or capative coupling means and in addition are responsive to the thermal condition of the electronic elements or components to establish fault signals capable of being utilized to remove the high voltage supply until the fault is corrected.

Figure 2:
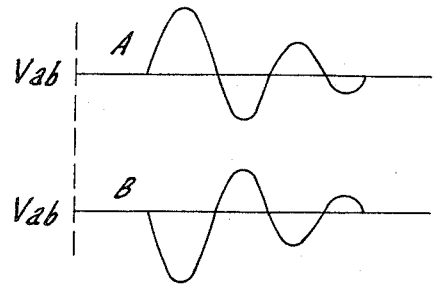

These and other objects and the attendant advantages, features, and uses of this invention will become more apparent to those skilled in the art as a more detailed description proceeds when considered in conjunction with the accompanying drawing in which:

FIGURE 1 illusrates a preferred embodiment of the invention in circuit schematic; and FIGURE 2 illustrates the phase relation of two fault signals developed in one of the high voltage supply circuits.

Referring more particularly to FIGURE 1, there is illustrated a high voltage supply circuit by the conductor means 10 and 11 across which is placed a capacitor 12. The high voltage conductor 10 is capacitor coupled through a capacitor 13 and resistors 14 and 15 to a fixed or ground potential. The juncture of resistors 14 and 15 is coupled through a resistor 16 to an output conductor 17 which is adapted to be coupled to a crowbar trigger amplifier (not shown) for use in amplifying any fault signals to short out or disconnect the high voltage power supply. The fault detector circuit includes a four-layer diode 18 having its anode coupled through an anode resistor 19 to a positive voltage supply at terminal 20 and to one plate of a capacitor 21, the opposite plate of which is coupled through a resistor 22 to the output conductor 17. The resistor 19 and a resistor 23 in series therewith provide a voltage divider to establish the anode voltage on one plate of the capacitor 21 and the anode of the four-layer diode 18. The cathode of the four-layer diode 18 is coupled to one terminal of a thermostat 24, the opposite terminal 25 of which is coupled to a second output conductor 26 and to a resistor 27. The cathode of the four-layer diode 18 is coupled by a conductor 28 to a voltage divider circuit consisting of the resistors 29 and 30, the upper terminal of resistor 29 being coupled to the direct current voltage supply 20. The lower terminals of resistors 30, 23, and 27 are coupled in common to one terminal of a resistor 31 having its opposite terminal connected to the junction of resistor 22 and capacitor 21.

The output conductor 26 from the thermostat terminal 25 is connected to the gating electrode of an SCR 35, the anode of which is coupled in series with an indicator light 36 to a ground terminal at 37 and the cathode of which is coupled to a negative direct current voltage source at 38. The gating or controlling electrode of the SCR 35 is connected through a coupling capacitor 39 to the anode of a second SCR 40, the anode voltage of which is established at the resistors 41 and 42 to the fixed voltage or grounding terminal 37. The SCR 40, like the SCR 35, has its cathode coupled directly to the negative direct current voltage supply 38. A storage capacitor 43 is coupled in parallel with the anode and cathode terminals of the SCR 40. Resistors 44 and 45 each bias the gating or controlling electrodes of the SCRs 40 and 35, respectively, from the negative direct current source 38 and also provide temperature stabilization of these rectifiers. A second high voltage direct current supply source in parallel to the high voltage supply source 10 and 11 is conducted over the conductor means 46 and 47 having a single loop in the high voltage conductor 46 operating as the primary winding of a transformer core 48. To the left and to the right of the transformer 48 are shown capacitors 49 and 50 across the high voltage circuit for the purpose of illustration herein. A secondary winding 51 on the transformer core 48 has one lead 52 thereof coupled through a resistor 53 and a resistor 54 in series to the gating or controlling electrode of the SCR 40. The other lead 55 is coupled through a resistor 56 and a capacitor 57 in series with capacitor 39 to the gating or controlling electrode of the SCR 35. The secondary 51 of the transformer has a resistor 58 across its leads 52 and 55 in parallel with a capacitor 59. Diodes 60 and 61 have their anodes coupled to the secondary leads 52 and 55, respectively, and their cathodes coupled in common to a fixed or ground potential. Diodes 62 and 63 each has its cathode coupled to the leads 52 and 55, respectively, and their anodes coupled in common to the negative direct current voltage source at 38. The circuit just described provides a means for developing a plurality of fault signals from a plurality of fault sources to develop fault signals to operate crowbar circuitry or an indicator to indicate which fault is existent.

Operation

In the operation of the device in FIGURE 1 let it be assumed that no fault occurs in the high voltage supplies 10, 11 and 46, 47 and that no excessive heat is being developed in any of the electronic equipment to cause operation of the thermostat 24. The thermostat 24 will remain open and the high voltage supplies 10, 11 and 46, 47 will supply high voltage to the radar or other equipment involved.

Let it be assumed, for the purpose of example, that the positive direct current voltage at terminal 20 is about 400 volts and that the negative direct current voltage supplied at terminal 38 is about −25 volts. If a fault occurs across the high voltage leads 10 and 11, for example, as shown by X which could be the shorting out of capacitor 12, the fault will cause a positive or negative signal to be conducted through the coupling capacitor 13 depending on whether the high voltage on conductor 10 is positive or negative. This will produce a discharge of the coupling capacitor 13 through the resistors 14 and 15 and this spike fault signal will be conducted through the resistor 16 to the output 17 operative to actuate the crowbar trigger amplifier or other circuitry (not shown) to short out or disconnect the high voltage supply 10, 11. In a second situation in which one of the radar or electronic components become overheated, thermostat 24 will close causing the four-layer diode 18 to avalanche. With the approximately 400 volts positive applied at terminal 20, the voltage divider 19 and 23 will have established, for example, 250 volts on the anode of the diode 18 as well as on the right hand plate of the capacitor 21. By virtue of the voltage divider 29 and 30 and their values the cathode of the diode 18 would have been biased to approximately 100 volts prior to the closing of thermostat 24. Upon closing of thermostat 24 the voltage on the cathode of the diode 18 is immediately dropped causing this diode to avalanche to bring the voltage across its anode and cathode to substantially zero potential. This will discharge capacitor 21 through the diode 18, the thermostat 24, and resistors 27 and 31. The discharge through the diode 18 produces a fault signal which is conducted through the resistor 22 to the output 17 operative to actuate the crowbar trigger amplifier or other circuitry (not shown) connected thereto to disconnect the high voltage supply 10, 11 supplying the electronic components in the area over which the thermostat 24 is acting as a sentinel. At the same time that the four-layer diode avalanches through the thermostat 24 contacts, the voltage on the cathode of the diode 18 producing the fault pulse is conducted by way of the conductor means 26 to gate the SCR 35 into conduction thereby lighting the indicator light 36. Once the SCR 35 is gated "on" it will remain "on" by virtue of the constant voltage across the supply terminals 37 and 38 to maintain current flow. The indicator light 36 will therefore remain aglow until the fault is corrected and the circuit from 37 to 38 switched off momentarily as by cutting the voltage supply 38 to reset the circuit. Since the thermostat 24 will remain closed for a few moments, the diode 18 will be cut off when its voltage is dropped to zero across its anode and cathode terminals which will allow capacitor 21 to recharge until the anode voltage builds up again to approximately 200 volts at which time diode 18 again avalanches sending another pulse to the outputs 17 and 26. This diode may avalanche to produce fault signals 2 or 3 times before thermostat 24 is opened.

With the indicator light 36 in the extinguished condition a fault in the high voltage supply 46, 47 will be detected in the transformer 48. For example, under one condition of fault, if the capacitor 49 is shorting out, as represented by the X adjacent thereto, a fault signal A, as illustrated in FIG. 2, will be induced in the secondary winding 52 producing a voltage $V_{ab}$ across the terminals 52 and 55. This fault signal will be conducted to the gating electrode of the SCR 40 thereby turning "on" this SCR to establish the circuit 52, 53, 54, 40, 63, 55. The diodes 60 and 61 act as limiters to limit the voltage from the transformer 48 to a maximum of the voltage applied at terminal 38 with respect to the cathodes of the SCR's 40 and 35. The gating or controlling electrodes of the SCR's 35 and 40 will be prevented from over voltage at all times. The positive portion of signal A turning "on" the SCR 40 discharges the capacitor 43. The resistor 42 is of high value which does not supply enough current to keep SCR 40 conducting so that the SCR 40 is turned "off" and the capacitor 43 can recharge for another transient. While the SCR 40 is conducting, the negative swing of signal A will be short circuited through the gating electrode and cathode so that it can not turn "on" the SCR 35. Since this is a fault to the left of the transformer 48 or the supply side of the high voltage circuit, no fault indication will result since a feature of this circuit is to indicate only faults on the load side.

If a fault occurs for example on the load side or to the right of the transformer 48 as by the shorting out of capacitor 50, as represented by the X fault, a voltage will be induced in the secondary 51 of the transformer to provide the fault signal as shown by B in FIGURE 2. It is to be noted that fault signal B is 180° out-of-phase with that of fault signal A. The negative swing on the lead 52 of the transient fault signal B relative to the positive swing on the lead 55 will have no affect on the SCR 40, but the positive swing on lead 55 relative to lead 52 will be conducted through the resistor 56 and the capacitors 57 and 39 to the gating or controlling electrode of the SCR 35 placing this SCR into conduction thereby causing the indicator light 36 to glow. The circuit from lead 55 is established, as heretofore stated, through elements 56, 57, 39, the cathode of SCR 35, and the diode 62 to the lead 52. The circuit through the anode and cathode of the SCR 35 and the indicator light 36 is from terminal 37 to 38. As may now be recognized the lower trip indicator circuit is actually a transient phase indicator determining whether the first pulse of the fault signal is positive or negative. Faults existing to the right of the transformer 48 or the load side of the high voltage circuit 46, 47 will produce a fault indication by the indicator light 36 in the same manner that a fault occurring by over heating of any of the electronic components or elements to close thermostat 24.

While many modifications and changes may be made in the constructional details and features of this invention in a departure from the preferred embodiment shown in FIGURE 1, it is to be understood that I desire to protect my inventive concept to the extent of the scope of the appended claims.

I claim:
1. A system for locating faults sensed by a plural fault sensing system comprising:
   at least two direct current voltage circuits in which faults are to be detected;
   one fault circuit having an output and being coupled through a capacitor to one of said two direct current voltage circuits, the discharge of the capacitor in said coupling by reason of a fault causing a voltage signal to be conducted as a fault signal on said output, and said one fault circuit also having a temperature responsive element in series with a four-layer diode in a voltage biased circuit to cause said four-layer diode to avalanche upon the closing of said temperature responsive element to produce a fault signal on said output;

a second fault circuit having a switching means in series with an indicator and being inductively coupled to the other of said direct current voltage circuits, by a transformer positioned to produce signals for faults in one direction along said other direct current voltage circuit that produce no indication on said indicator and to provide signals for faults in the other direction along said other direct current voltage circuit that produce indications on said indicator, and said temperature responsive element of said first fault circuit being coupled to said switching means of said second fault circuit to produce indications on said output and on said indicator for indicating faults in said direct current voltage circuits.

2. A system for locating faults as set forth in claim 1 wherein said switching means includes a first silicon controlled rectifier having a control electrode to which is coupled said temperature responsive element in said one fault circuit and the inductive coupling of said other direct current voltage circuit whereby a fault operative to close the circuit through said temperature responsive element and a fault in said other direct current voltage circuit produce an indication on said indicator.

3. A system for locating faults as set forth in claim 2 wherein said second fault circuit includes a second silicon controlled rectifier having a control electrode coupling said transformer coupling and having an anode coupled through a capacitor to the anode of said first switching silicon controlled rectifier whereby said second silicon controlled rectifier is controlled into conduction by signals for faults in one direction along said direct current voltage circuit to short said transformer coupling and said first switching silicon controlled rectifier is controlled into conduction to produce indications on said indicator by signals for fault in the other direction along said direct current voltage circuit.

4. A system for locating faults sensed by a plural fault sensing means comprising:

at least two direct current high voltage supply circuits in which faults are to be detected;

one fault circuit having a first output adaptable to be coupled to a crowbar trigger amplifier and having a second output, said one fault circuit including a four-layer diode in series with a thermostat located in an area responsive to heat generated by radar components, said thermostat being coupled to said first and second outputs, said four-layer diode and thermostat being in a voltage biasing circuit, and said one fault circuit being coupled to one of said direct current high voltage supply circuits to cause a fault signal to be produced on said first output upon a fault in said one direct current high voltage supply circuit and to cause a fault signal to be produced on both said first and second outputs when said thermostat is actuated by excessive heat to a closed condition;

a second fault circuit having two silicon controlled rectifiers in a biasing network, the control electrodes thereof being coupled to opposite output leads of an inductive coupling to the other of said direct current high voltage supply circuits to control the respective rectifier into conduction on opposite voltage polarities of fault in said other direct current high voltage supply circuit, and said second output of said first fault circuit being coupled to the control electrode of one of said rectifiers to control this rectifier into conduction upon the conduction of a fault signal from said first fault circuit; and an indicator circuit in circuit with the anode of said one of said rectifiers to indicate conduction of said rectifier whereby faults in either of said direct current high voltage supply circuits by electrical shorts and faults caused by over heating of electrical components in the area of said thermostat will be indicated by said indicator.

5. A system for locating faults as set forth in claim 4 wherein said inductive coupling is a transformer, the primary of which is in circuit with said other direct current high voltage supply circuit and the secondary of which has two leads constituting said opposite output leads, the control electrode of said one rectifier being coupled to said secondary lead through capacitive and resistive means and the control electrode of said other rectifier being coupled to said secondary through resistive means whereby faults occurring in said other direct current high voltage supply on opposite sides of said transformer primary will produce opposite voltage polarity fault signals in said secondary for detection and indication by said rectifiers and indicator.

6. A system for locating faults as set forth in claim 5 wherein said coupling of said second fault circuit and the other of said direct current high voltage supply circuit includes limiting means to limit said fault signals in amplitude with respect to the voltage amplitude of the silicon controlled rectifier cathodes, said cathodes being coupled in common.

7. A system for locating faults as set forth in claim 6 wherein said four-layer diode anode and the anode of the other of said silicon controlled rectifiers are each coupled to capacitive networks to discharge through the respective four-layer diode and rectifier.

8. A crowbar trip and trip indicator circuit comprising:

a direct current high voltage supply circuit in which faults are to be detected;

a fault detection circuit including a four-layer diode and a thermostat in series, the anode of said four-layer diode being coupled to a voltage source through a load resistor and having a capacitor storage element in circuit to the thermostat to discharge said capacitor though said four-layer diode when said thermostat is closed by a fault in electronic components producing heat in the area of said thermostat, and a first output from said thermostat;

a capacitive coupling of said direct current high voltage supply and said fault detection circuit to a second output adapted to control the cutoff of said high voltage supply, said thermostat being coupled through resistance to said second output; and an indicator coupled to said first output whereby faults produced by short circuits in said high voltage supply and faults occurring in electronic components causing heat to close said thermostat will produce a fault signal on said second output and whereby faults occurring to close said thermostat will be indicated on said indicator.

9. A crowbar trip and trip indicator circuit comprising:

a direct current high voltage supply circuit to a load in which faults are to be detected;

a fault detection circuit including first and second silicon controlled rectifiers in a voltage biasing network, the first rectifier of which has a gating electrode and an anode coupled to a storage capacitor in said biasing network and the second rectifier of which has a gating electrode;

a transformer having the primary in circuit with the high voltage supply circuit and a secondary having one lead coupled through resistance means to the gating electrode of said first rectifier and the other lead coupled through resistance and capacitance means to the gating electrode of said second rectifier; and an indicator coupled to the anode of said second rectifier in said biasing network to indicate conduction of said second rectifier whereby faults occurring on the load side of said high voltage supply from said transformer will produce fault signals in said transformer secondary of one polarity to place said second rectifier into conduction and whereby faults occurring on the supply side of said high voltage supply from said transformer will produce fault signals in said transformer secondary of the other polarity from said first-mentioned fault signals to gate said first rectifier into conduction.

References Cited by the Examiner

UNITED STATES PATENTS 3,143,729  8/1964  Power _____ 340—253

NEIL C. READ, *Primary Examiner.*

D. K. MYER, *Assistant Examiner.*